(12) United States Patent  
Cody et al.

(10) Patent No.: US 9,332,127 B1
(45) Date of Patent: May 3, 2016

(54) MOBILE DEVICE USER INTERFACE NOTIFICATION MANAGEMENT

(71) Applicant: Sprint Communications Company L.P., Overland Park, KS (US)

(72) Inventors: Tamara Lynn Cody, Lee's Summit, KS (US); Allison A. DiMartino, Overland Park, KS (US); Harry Lai, Overland Park, KS (US); Brian R. Landers, Leawood, KS (US); Jason Rincker, Overland Park, KS (US); Christine Denise Schumaker, Olathe, KS (US); Balaji S. Thenthiruperai, Prairie Village, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 66 days.

(21) Appl. No.: 14/083,441

(22) Filed: Nov. 18, 2013

Related U.S. Application Data

(63) Continuation of application No. 12/772,831, filed on May 3, 2010, now Pat. No. 8,614,968.

(51) Int. Cl.
*G06F 15/82* (2006.01)
*H04M 3/537* (2006.01)
*H04W 4/12* (2009.01)

(52) U.S. Cl.
CPC .............. *H04M 3/537* (2013.01); *H04W 4/12* (2013.01)

(58) Field of Classification Search
CPC ........... G06F 15/82; G06F 17/30; G06F 7/20; G06F 7/10
See application file for complete search history.

(56) References Cited

U.S. PATENT DOCUMENTS

| | | | |
|---|---|---|---|
| 8,614,968 B1 | 12/2013 | Cody et al. | |
| 2009/0031245 A1* | 1/2009 | Brezina et al. | 715/781 |
| 2009/0177754 A1* | 7/2009 | Brezina et al. | 709/206 |
| 2010/0042669 A1* | 2/2010 | Cohen et al. | 709/201 |
| 2010/0042699 A1 | 2/2010 | Hernandez et al. | |

OTHER PUBLICATIONS

FAIPP Pre-Interview Communication dated Jun. 5, 2012, U.S. Appl. No. 12/772,831, filed May 3, 2010.
FAIPP Office Action dated Nov. 21, 2012, U.S. Appl. No. 12/772,831, filed May 3, 2010.
Final Office Action dated Apr. 25, 2013 U.S. Appl. No. 12/772,831, filed May 3, 2010.
Notice of Allowance dated Aug. 16, 2013, U.S. Appl. No. 12/772,831, filed May 3, 2010.

* cited by examiner

*Primary Examiner* — Myron K Wyche

(57) ABSTRACT

A portable electronic device is provided. The portable electronic device comprises a processor, a memory, a display, and a first application stored in the memory that, when executed by the processor, receives indications of a plurality of events. The application also stores event information associated with the events in the memory, and when a user interface of a second application that is presented on the display is navigated away from, presents an announcement about one of the stored event information on the display.

20 Claims, 7 Drawing Sheets

First Screen View 202

| Text Message 3 (new) |
| --- |
| Instant Message 2 (new) |
| Text Message 2 (previous) |
| Text Message 1 (previous) |
| Missed Call 1 (previous) |
| Voicemail Message 1 (previous) |
| Instant Message 1 (previous) |
| Hardware Failure Alert 1 (previous) |
| Electronic Mail Messages (4) |
| Social Networking Notices (8) |

Second Screen View 204

| Voicemail Message 2 (new) |
| --- |
| Text Message 4 (new) |
| Text Message 3 (previous) |
| Instant Message 2 (previous) |
| Text Message 1 (previous) |
| Voicemail Message 1 (previous) |
| Hardware Failure Alert 1 (previous) |
| Electronic Mail Messages (5) |
| Social Networking Notices (3) |

FIG. 2

FIG. 5
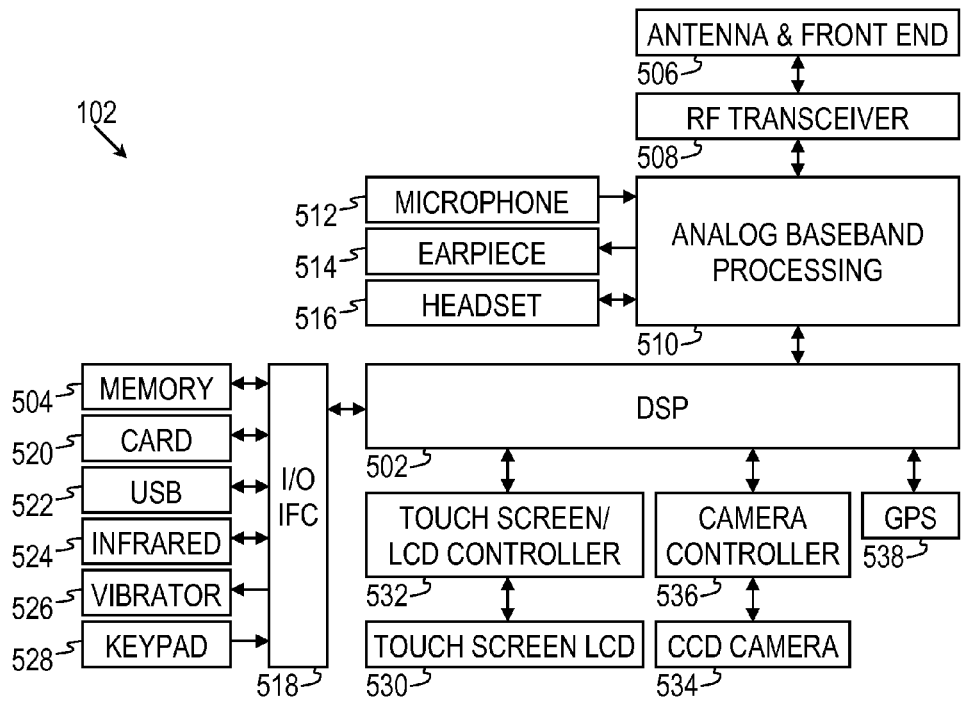
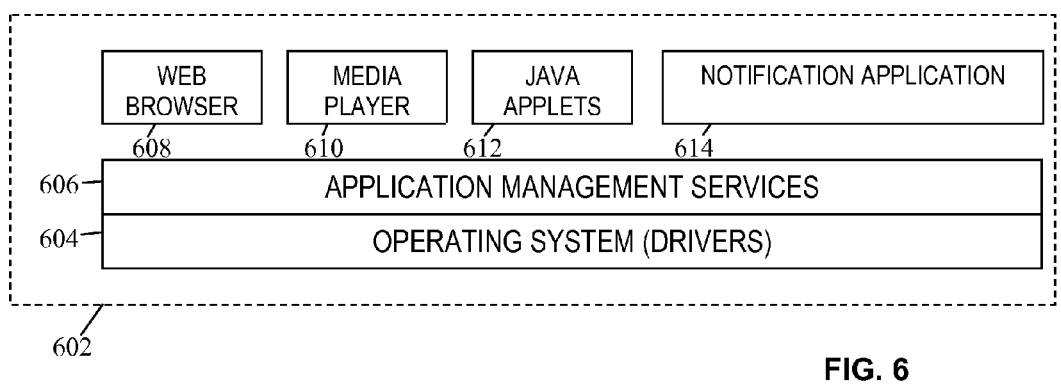
FIG. 6

MOBILE DEVICE USER INTERFACE NOTIFICATION MANAGEMENT

CROSS-REFERENCE TO RELATED APPLICATIONS

This application is a continuation of and claims priority under 35 U.S.C. §120 to U.S. patent application Ser. No. 12/772,831, filed on May 3, 2010, entitled "Mobile Device User Interface Notification Management", by Tamara Lynn Cody, et al., which is incorporated herein by reference for all purposes.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Portable electronic devices may provide access to a plurality of services including voice telephone communications and associated voice messaging services, electronic mail services, short messaging services (SMS), referred to hereafter as text messaging, multimedia messaging services (MMS), and instant messaging services. Portable electronic devices also permit Internet access to the World Wide Web and other Internet Protocol (IP) based services. Such services may include downloading software applications and using online and cloud-based application services. Such services also may include viewing and posting messages and other content to weblogs or blogs and engaging in online transactions for buying and selling goods and services. Portable electronic devices are used to interact with a plurality of parties on social networking Internet sites and other online venues to exchange photographs and other images, music and other audio content, video content, and text-based material. Portable electronic devices may serve a plurality of other functions such as recording and playing music, voice, and video content, photographing and displaying still images, and providing workplace support with word processing, spreadsheet, and other office productivity applications.

SUMMARY

In an embodiment, a portable electronic device is provided. The portable electronic device comprises a processor, a memory, a display, and a first application stored in the memory that, when executed by the processor, receives indications of a plurality of events. The application also stores event information associated with the events in the memory, and when a user interface of a second application that is presented on the display is navigated away from, presents an announcement about one of the stored information on the display.

In an embodiment, a portable electronic device is provided. The portable electronic device comprises a processor, a memory, a display, and an application stored in the memory that, when executed by the processor, receives indications of a plurality of events. The application also presents a list of the plurality of events wherein the list comprises an entry for each missed call among the first plurality of events, an entry for each pending text message among the first plurality of events, an entry for each pending instant message among the first plurality of events, a single entry for a plurality of emails among the first plurality of events, and a single entry for a plurality of update messages from a social networking facility among the first plurality of events.

In an embodiment, a processor-implemented method of presenting information about events on a portable electronic device is provided. The method comprises a portable electronic device storing information about a first event in a memory of the portable electronic device. The method also comprises the portable electronic device storing information about a second event in the memory, wherein the information about the second event is stored in the memory after the information about the first event is stored in the memory. When a user interface of an application that is presented on a display of the portable electronic device is navigated away from, the method also comprises the portable electronic device presenting a message about the second event on the display. After the message about the second event has been presented for a predetermined time duration, the method also comprises the portable electronic device removing the message about the second event from the display. The method also comprises the portable electronic device presenting a first notification screen on the display at a first time, the first notification screen comprising a first list of entries associated with a plurality of events, the first list comprising a first entry associated with the first event, a second entry associated with the second event, an entry for each missed call among the plurality of events, an entry for each pending text message among the plurality of events, an entry for each pending instant message among the plurality of events, a single entry for a plurality of emails among the plurality of events, and a single entry for a plurality of update messages from a social networking facility among the plurality of events. The method also comprises the portable electronic device receiving a response input associated with the first event after the first time and before a second later time and receiving a response input associated with the second event after the first time and before the second time. The method also comprises the portable electronic device presenting a second notification screen on the display at the second time, the second notification screen comprising a second list of entries associated with a plurality of events comprising an entry for each missed call among the plurality of events, an entry for each pending text message among the plurality of events, an entry for each pending instant message among the plurality of events, a single entry for a plurality of emails among the plurality of events, and a single entry for a plurality of update messages from a social networking facility among the plurality of events, not comprising an entry for the first event, and not comprising an entry for the second event.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

FIG. 2 is an illustration of exemplary notification screens according to an embodiment of the disclosure.

FIG. 5 is a block diagram of a mobile device according to an embodiment of the disclosure.

FIG. 6 is a block diagram of a software architecture for a mobile device according to an embodiment of the disclosure.

DETAILED DESCRIPTION

Figure 1:
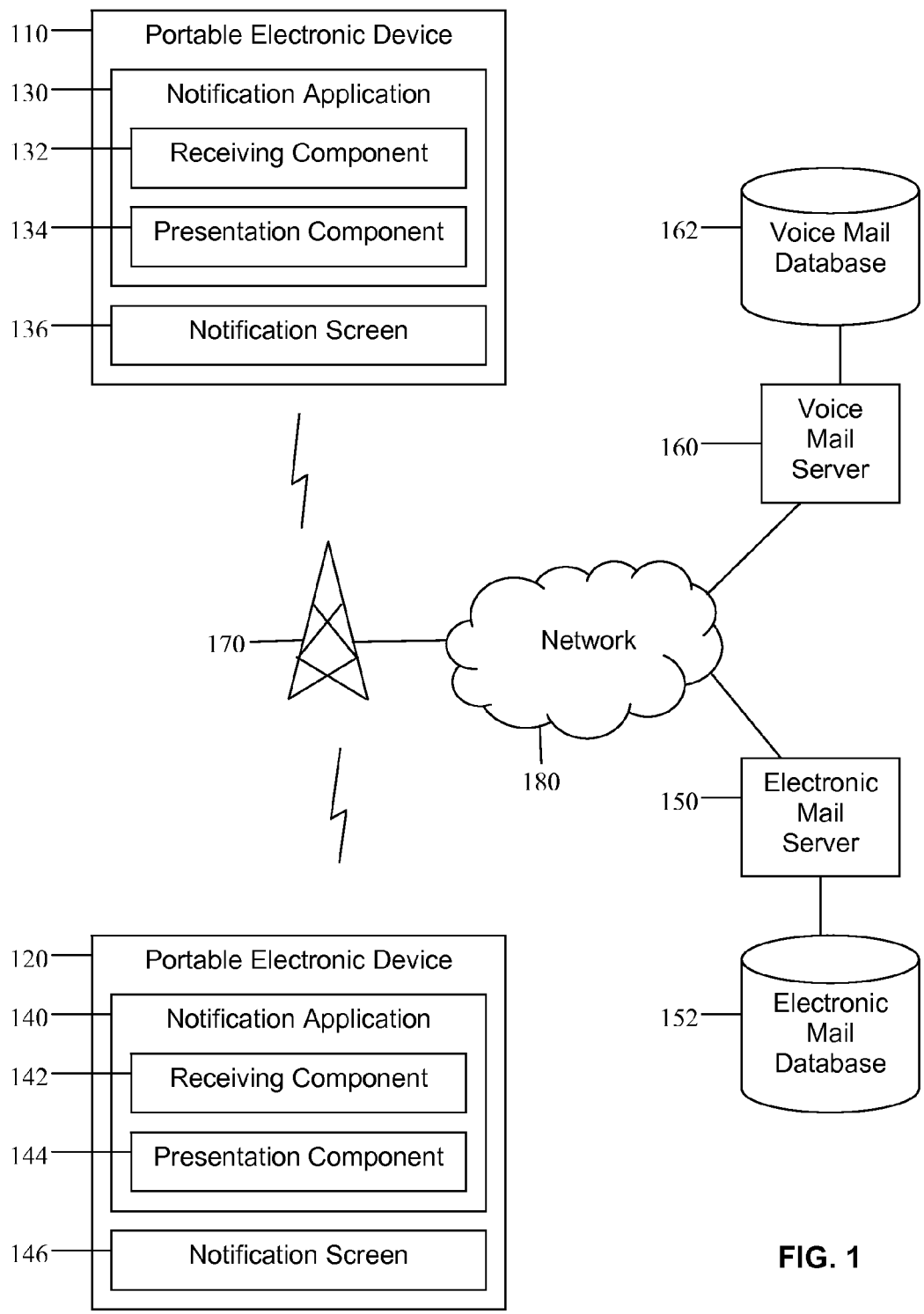
FIG. 1 is a block diagram of a system according to an embodiment of the disclosure.

It should be understood at the outset that although illustrative implementations of one or more embodiments are illustrated below, the disclosed systems and methods may be implemented using any number of techniques, whether currently known or in existence. The disclosure should in no way be limited to the illustrative implementations, drawings, and techniques illustrated below, but may be modified within the scope of the appended claims along with their full scope of equivalents.

The present disclosure teaches an application for user notification executing on a portable electronic device that displays several types of notifications when any one of a plurality of different types of events occur. The notification application may display notifications about events in small temporary windows and in notification screens listing multiple events. Events may be associated with incoming communications of various types and with messages generated internally by the portable electronic device. When the portable electronic device receives a text message or instant message, for example, the notification application may display an announcement transiently in a small window within the display of the portable electronic device. The most recently received external communication or internally generated message may be briefly displayed when the user navigates away from an application within which the user had been working when the text or instant message was received or the next time the portable electronic device is powered on or otherwise activated.

The notification application also presents a message associated with external communications and internally generated messages in the notification screen that provides a chronological or other listing of external communications and internally generated messages that have not yet been opened or accessed by the user. Messages may continue to be presented in the notification screen until the message is highlighted, accessed, opened, or otherwise acted upon by a user of the portable electronic device, which may be referred to in some contexts as actioning the message and the subject message may be said to have been actioned. In some cases, the underlying application associated with the message may be invoked and activated by selecting the message, for example by highlighting the message and/or clicking on the message. Once a message has been accessed, viewed, and/or actioned, this message may not be presented in the notification screen in subsequent times the notification screen is opened.

Events may comprise communications coming to the portable electronic device from sources external to the portable electronic device including telephone voice mail messages, text messages, instant messages, electronic mail messages, and notifications from social networking sites. Events comprising internally generated messages may comprise messages about missed phone calls, messages generated by a calendaring application, internal messages advising that an application has completed executing a task or the application has failed, and messages about hardware status, for example. The notification application may list, prioritize, and group messages associated with external communications and internally generated messages in a variety of manners.

The present disclosure teaches the transient presentation of an announcement advising the user of the most recent external communication or internal event occurring on the portable electronic device. Such announcements presented transiently and additional external communications and internal messages are placed in the notification screen that may be viewed as a front end for most or all new communication and other event notification activity. Messages appearing in the notification screen may provide access to the messages through their applications. Opening a message in the notification screen about an instant message, for example, may result in the instant message application activating on the portable electronic device and causing the instant message to be displayed for the user's review and response or deletion. In alternative embodiments, instead of the single most recent external communication or internal event being announced, the most recent two or three such items could be announced or the communications or events that occurred within the last five minutes, ten minutes, or other time period could be announced. In yet another alternative embodiment, the communications or events that occurred since the user began using a particular application could be announced.

Turning now to FIG. 1, a system 100 of mobile device user interface notification management is described. The system 100 comprises portable electronic devices 110, 120, notification applications 130, 140, notification screens 136, 146, an electronic mail server 150, an electronic mail database 152, a voice mail server 160, a voice mail database 162, a base transceiver station 170, and a network 180.

The portable electronic devices 110, 120 may be one of a mobile phone, a personal digital assistant (PDA), and a media player. The portable electronic device 110, 120 comprises a radio transceiver that transmits and receives based on at least one of a code division multiple access (CDMA) technology, a global system for mobile communication (GSM) technology, a long-term evolution (LTE) technology, and a worldwide interoperability for microwave access (WiMAX) technology.

The notification application 130 executes on the portable electronic device 110 and temporarily presents announcements on a home page or other screen of the portable electronic device 110 and also posts the announcements as messages in the notification screen 136. The announcements are generated and displayed when the user of the portable electronic device 110 navigates away from an open application or powers on or otherwise activates the portable electronic device 110. An announcement briefly describes the most recent external communication or internal message received before the user navigated away from the open application or activated the portable electronic device 110. External communications may comprise the receipt of a telephone voice mail message, an electronic mail message, a text message, an instant message, and other types of incoming communications. Events also may be generated within the portable electronic device 110 and may be associated with calendaring, application, and hardware events or occurrences. The notification application 130 may present the announcement immediately upon occurrence of the event or wait until the user returns to the home page or navigates away from the application in which the user was engaged when the event occurred. The notification screen 136 in which announcements are posted as messages lists external communications and internally generated messages that have not yet been acted upon or actioned by the user. Once actioned, the messages may remain saved in their own application folders but no longer appear in the notification screen 136.

The portable electronic device 110 may receive a plurality of external communications and internally generated messages during a period of time that a user is working in an application or the portable electronic device 110 is powered off. The notification application 130 may present as an announcement only the most recently received item at the time the user navigates away from the application or powers on the portable electronic device 110. While the notification application 130 may place most or all received messages in the notification screen 136, only the most recently received message is displayed as an announcement. Events listed as messages in the notification screen 136 include events displayed in announcements. There may be nothing that distinguishes a message initially displayed as an announcement from all other messages displayed in the notification screen 136 other than that an event displayed as an announcement was by coincidence the most recent event to occur before the user navigated away from an application.

The notification application 130 may present announcements in a small message window that remains visible for a short period, for example ten seconds, while the home page of the portable electronic device 110 is presented or the user navigates away from or exits an application or ends a telephone call. The announcement is intended to notify the user of the most recent external communication or internally generated message. The present disclosure teaches the notification screen 136 as a list of pending messages or potential action items that have yet to be accessed and includes messages that were earlier displayed as announcements.

The notification screen 136 may list messages associated with some events individually, such as missed telephone calls, text messages, and instant messages. The notification screen 136 may list other messages describing events in groups, such as electronic mail messages and announcements from social networking Internet sites and other sources. Messages for events segregated into such group listings may be confined to the bottom of the viewable area of the notification screen 136. The notification application 130 retains messages in the notification screen 136 until the messages are accessed. The present disclosure teaches messages opened from within the notification screen 136 or opened from within their own applications not being presented in the notification screen 136 thereafter but with the messages remaining available within their own application functionality. The notification application 130 presents external communications and internally generated messages that have yet to be highlighted, accessed, or actioned from within the notification screen 136 or from within their own underlying applications. Other than presenting these unaccessed messages and providing the ability to access these messages, the notification application 130 may not interact with the underlying applications. Once accessed, these messages do not again appear in subsequent presentations of the notification screen 136. In an alternative embodiment, instant messages may not be listed individually but may instead be grouped together in a manner similar to that described for electronic mail messages and social networking notices.

The notification application 130 comprises the receiving component 132 that receives information about external communications and internally generated messages. The receiving component 132 may poll applications executing on the portable electronic device 110 or elsewhere to learn of the receipt of external communications such as the receipt of a text message, for example. The receiving component 132 may be provided advice of each external communication while the external communication item is being placed into its own application inbox or when the notification screen 136 is being invoked. The notification application 130 may poll the applications for unactioned events, either periodically or at the time the notification screen 136 is invoked for presentation. External communications may comprise telephone voice mail messages, text messages, simple message service (SMS) messages, instant messaging messages, multimedia messaging service (MMS) messages, picture messages, push-to-talk (PTT) messages, and electronic mail messages. External communications may also comprise incoming transmissions from social networking Internet sites and other social networking sources. Such incoming social networking transmissions may be personally directed messages from the sender to the user of the portable electronic device 110 or they may be general distribution messages from the sender to a plurality of portable electronic devices 110, 120. The present disclosure teaches, in some embodiments, different methods of handling of the various types of social networking messages that a portable electronic device 110 may receive. Social networking messages that are directed personally to the user of the portable electronic device 110 may be treated as individually received messages as are, for example, instant messages and text messages. Social networking messages that are general distribution messages or announcements sent to the portable electronic device 110 and a plurality of other recipients may be grouped collectively and displayed as a single item in the notifications screen 136 in a manner similar to the treatment of electronic mail messages.

The receiving component 132 also takes delivery of events that are generated internally by the portable electronic device 110. Such events may comprise messages that an incoming telephone call was missed without the caller leaving a voice mail message. Such events may comprise messages from a calendaring or other application executing on the portable electronic device 110. Such events may comprise hardware-related messages that the battery power is low, or that a component is failing, for example. A communication item may comprise both internal and external elements. An application or other item of software may be downloading from the Internet and when finished, a component internal to the portable electronic device 110 may notify the receiving component 132. When a caller to the portable electronic device 110 hangs up without leaving a message as noted above, the notice to the receiving component 132 about the missed call may be generated internally even though the precipitating event occurred externally.

The present disclosure may not provide for the receiving component 132 intercepting, intervening in, or altering the actions of an underlying communications application executing on the portable electronic device 110 other than causing the received external communication to be opened when the user selects the corresponding message in the notification screen 136. The receiving component 132 may monitor the radio transceiver and other components of the portable electronic device 110 for signals indicating the occurrence of externally originating communications events as well as internally occurring events. The receiving component 132 may regularly poll applications for unactioned events. The notification application 130 may interact with application programming interfaces (API) of the text messaging and voice mail applications, for example, that permit the receiving component 132 to cause the incoming communications items to be opened upon the user's action. The receiving component 132 may detect from the radio transceiver that a text message was received, for example. The receiving component 132 may contact the text messaging application executing on the portable electronic device 110 and establish a link to the newly received text message allowing the receiving component 132 to cause the text message to be opened upon user action. The receiving component 132 may not intercept the incoming text message or otherwise interfere with its movement but may rather allow it to be received by the text messaging application and stored in the application's inbox as it normally would.

The notification application 130 interacts with the text messaging application, for example, to receive the information it needs to create the announcement, if appropriate, as well as create the message that will be displayed in the notification screen 136. Incoming text messages, electronic mail messages, and other inbound messages are received and stored in their application inboxes, not in a file associated with the notification application 130. The present disclosure teaches the notification application 130 functioning in an information providing and message opening role. The service provided to the user is to make the user aware that an external communication or internal event has taken place.

The notification application 130 also comprises the presentation component 134 that presents the most recently received external communication item or internally generated message in an announcement comprising one or two lines. The announcement may be displayed for a predefined time duration of less than ten seconds. The present disclosure teaches the presentation of this announcement when the user of the portable electronic device 110 navigates away from an application the user is currently using. Navigating away from an application may comprise the user exiting the application entirely, minimizing the application in a graphical user interface (GUI) of the portable electronic device 110, or opening an additional application. If the user is engaged in a telephone call on the portable electronic device 110, navigating away may comprise the telephone call ending. The presentation component 134 may maintain a file containing a chronological queue of external communications and internally generated messages received during the user's application session. When the user navigates away from the current application, the presentation component 134 may access the file and draw the most recently received external communication or internal message. The presentation component 134 presents the announcement of the external communication or internal message for a duration of less than ten seconds. The information presented may comprise the type of message received, the sender, and the date and time received. In an embodiment, the user may position a finger or electronic pointer over the announcement to prevent it from automatically disappearing and therefore be able to examine the announcement for a longer period. In an embodiment, the user may be able to click on, tap on, or otherwise take action to activate and open the announcement.

In addition to displaying the announcement upon detecting that the user has navigated away from an application, the presentation component 134 may display the announcement upon detecting that the portable electronic device 110 has just been powered on or brought out of a dormant or inactive state. In this circumstance, the presentation component 134 may display as an announcement the last external communication or internal message received before the portable electronic device 110 was powered off or entered the dormant state. In an embodiment, when the portable electronic device 110 is powered on or is brought out of the dormant state, the notification application 130 may wait a predefined amount of time to permit the portable electronic device 110 to announce itself on the network 180 wherein external communications waiting out on the network 180 as well as pending internally generated messages may be received by the receiving component 132. The notification application 130 then may display the most recently received external communication or internal message as an announcement as described. In an embodiment, the presentation component 134 may not present the announcement until the user returns to the home screen or panel or other predefined screens of the portable electronic device 110.

In addition to displaying the most recently received external communication or internal message, the presentation component 134 also presents unactioned or unaccessed external communications and internal messages in the notification screen 136. The presentation component 134 presents these unactioned or unaccessed messages whether received during the user's most recent application session, during previous application sessions, or while the portable electronic device 110 may have been powered off or otherwise inactive. The present disclosure teaches the presentation component 134 posting such messages for event items in chronological order with the most recently received unactioned or unaccessed message at the top of the notification screen 136. A message may describe the type of external communication, for example a text message, the identity of the sender, and the date and time of the external communication, i.e. when the message was received. The message presented also may provide a signal or other indication if the message is urgent or if some kind of response is imminently needed by the sender. The message also may include a photograph of the sender or another image or personalized information placed into the message by the sender. A photograph of the sender, other image, or other personalized information also may be associated with the sender's contact information that may be saved on the portable electronic device 110.

The presentation component 134 may present messages in the notification screen 136 for each individual missed phone call, voice mail message, text message, and instant message received. Multiple messages of these types received from the same sender are listed individually. The presentation component 134 may also create a single entry in the notification screen 136 for each internally generated message received. The presentation component 134, by contrast, may create a single entry in the notification screen 136 for a plurality of electronic mail messages received regardless of the sender. The presentation component 134 also may create a single entry in the notification screen 136 for a plurality of general distribution messages received from social networking sites. The notification screen 136 displays a single line item containing electronic mail messages and contains another line item containing general distribution messages received from social networking sites. These line items may resemble individual messages in appearance in the notification screen 136 but instead may display the number of individual electronic mail messages or social networking messages contained within the line items and also may display the date, time, and sender of the most recent message contained within. The present disclosure teaches the individual presentation of external communications and internal messages meant for the user of the portable electronic device 110 personally. By gathering received electronic mail messages and social networking site distribution messages in single entries in the notification screen 136, the present disclosure may suggest a lower prioritization for such messages.

The notification screen 136 may be accessed from the home screen or other screen upon action by the user. In an embodiment, the user may use a pointing device or finger to touch a lip or slight protrusion from a menu bar in the portable electronic device 110 to cause the notification screen 136 to appear. Each time the user invokes the notification screen 136, the notification screen 136 lists external communications and internal messages received since the previous time the notification screen 136 was invoked for presentation. The notification screen 136 also displays older messages that had been displayed in the immediately previous notification screen 136 that were not accessed during that previous invocation and remained unactioned or unaccessed. In some embodiments, the notification application 130, 140 could age out messages that have not been accessed for a predetermined period of time. The notification application 130, 140 could also phase out old but unactioned messages as a threshold total number of received messages is reached. Messages that had been displayed in previously presented notification screen 136 that the user accessed during an earlier session do not appear in the current notification screen 136. Messages that are unactioned or unaccessed may continue to be displayed in the notification screen 136 until they are accessed. What was displayed previously but not accessed is continually displayed in notification screen 136 until accessed. Once accessed, messages may not appear in subsequent notification screen 136. External communications and internal messages that are received after the closure of a notification screen 136 and accessed from within their own applications before the notification screen 136 is next invoked may not appear in the next or subsequent notification screen 136. Because those external communications and internal messages have been accessed, they may not be displayed in the notification screen 136 the next time it is invoked. Such messages that are received and accessed from within their own applications between invocations of the notification screen 136 may never be displayed in an invocation of the notification screen 136. While the presentation component 134 may present messages in the notification screen 136 in reverse chronological order with the most recently received message appearing at the top of the list and without regard to the type of messages displayed, in an embodiment the presentation component 134 may present the messages using chronological ordering or a different ordering or arrangement method.

As noted, the presentation component 134 may present electronic mail messages in a single item in the notification screen 136 instead of individually as is the case for text messages, instant messages, and other incoming transmissions as previously described. The presentation component 134 also groups incoming general social networking announcements in a similar manner in a single notification screen 136 item. In an embodiment, the present disclosure teaches the placement of the single notification screen 136 listings associated with the grouped electronic mail items and the grouped social networking items at the bottom of the displayed portion of the notification screen 136 below a scrollable list of individually displayed messages. Even though the full listing of the messages in the notification screen 136 may be longer than can be displayed in a single view of the notification screen 136 and hence not possible to be all viewed at once, the two items for the grouped electronic mail items and the grouped social networking items may remain persistently at the bottom of the viewable portion of the notification screen 136. The two items remain in the same place no matter the portion of the notification screen 136 in which the user may be scrolling.

The portable electronic device 120 is substantially similar to the portable electronic device 110 in feature and functionality. The notification application 140 executes on the portable electronic device 120 and comprises the receiving component 142 and the presentation component 144 and are substantially alike components of similar name resident on the portable electronic device 110.

Turning now to FIG. 2, two sample views of the notification screen 136 are presented to illustrate the actions of the presentation component 134 with regard to the notification screen 136. FIG. 2 depicts a first screen view 202 and a second screen view 204 of the notification screen 136 presented on the portable electronic device 110. The first screen view 202 and the second screen view 204 depict chronologically successive views of the notification screen 136 of the portable electronic device 110. A user of the portable electronic device 110 may navigate away from a first application in which the user has been working for a period of time and access the first screen view 202. The first screen view 202 may contain messages that were received since the last time the user examined the notification screen 136 and may contain older unactioned messages existing prior to the user's previous viewing of the notification screen 136 in the first screen view 202.

The first screen view 202 contains a plurality of different types of messages displayed in the order in which they were received. As noted, electronic mail messages and social networking site announcements are grouped collectively in single entries that persistently remain at the bottom of the displayed portion of notification screen 136. Each of the single entries may display the total number of electronic mail messages and social networking site announcements contained within each entry. Upon accessing the notification screen 136 and examining the first screen view 202, the user observes two messages received since the last time the notification screen 136 was presented as well as five messages that appeared in the previous notification screen 136 that the user did not select. Moments before accessing the first screen view 202 the user may have seen an announcement advising of the receipt of Text Message 3 because that message is the most recently received external communication or internal message. The discussion of FIG. 2 will assume that while examining the first screen view 202 of the notification screen 136, the user clicks on or otherwise accesses only Text Message 2, Missed Call 1, and Instant Message 1, leaving the other posted messages untouched and not yet viewed. The user closes the first screen view 202. The user then begins accessing a second application on the portable electronic device 110.

Continuing discussion of FIG. 2, the user may later navigate away from the second application, be presented an announcement of the most recent external communication or internal message received, and then open the notification screen 136 again, this time depicted as the second screen view 204. The second screen view 204 shows that Text Message 2, Missed Call 1, and Instant Message 1 are no longer present and at the top are two new messages, Voicemail Message 2 and Text Message 4. The items that had been shown in the first screen view 202 as "new," (Text Message 3 and Instant Message 2), that are displayed again in the second screen view 204 because they were not accessed during the earlier session, are now marked as "previous" in the second screen view 204. Newly received items are placed at the top of the notification screen 136. If the listing of messages exceeds the viewing area of the notification screen 136, the user may scroll down and view the listing of the oldest messages at the bottom of the scrollable list that still await initial user access. The ordering of the messages in FIG. 2 with the older messages having the lower numbers and the newer messages having the higher numbers has been depicted in such a manner for discussion purposes. Embodiments of the present disclosure may number and sequence messages in the notification screen 136 in a plurality of different manners. Shortly after a user of the portable electronic device 110 navigated away from the second application, the presentation component 134 would have displayed an announcement showing Voicemail Message 2 because that external communication was the most recently occurring event at the time. The placement of messages into the first screen view 202 and the second screen view 204 and the determination of message location and ordering after notification screens 136 are closed may constitute stateful behavior by the notification application 130.

The placement of the words "new" and "previous" next to messages in FIG. 2 is for discussion and demonstration purposes. In an embodiment, messages displayed in the notification screen 136 may not be accompanied by the words "new" or "previous." The items in the first screen view 202 and the second screen view 204 for electronic mail messages and social networking notices display the quantities of each type of message presently waiting to be accessed.

The electronic mail server 150 may process electronic mail messages received from a plurality of senders, for example the portable electronic device 120 that may send an electronic mail message to the portable electronic device 110, as well as from other sending components not shown in FIG. 1. The electronic mail database 152 is associated with the electronic mail server 150 and may store electronic mail messages received by the portable electronic devices 110, 120. When an electronic mail message is received by the portable electronic device 110, the electronic mail message may be stored in the electronic mail inbox associated with the portable electronic device 110 that may reside in the electronic mail database 142.

The voice mail server 160 may process telephone voice mail messages received from a plurality of callers. When a caller initiates a call to the portable electronic device 110 and the user of the portable electronic device 110 does not answer, the caller may leave a voice mail message for the user. The voice mail message may be managed by the voice mail server 160 and stored in the voice mail database 162 that is associated with the voice mail server 160. When the user of the portable electronic device 110 later navigates away from the current application in which the user has been working, after seeing an announcement containing information about the most recently received external communication or internal message, the user may then access the notification screen 136. The user will see in the notification screen 136 an item for the voice mail message. If the user clicks on or otherwise selects the voice mail message, a network session may be initiated with the voice mail server 160 and the voice mail message may be retrieved from the voice mail database 162 and played on the portable electronic device 110.

The base transceiver station 170 may be any of a cellular wireless base station, for example a Code Division Multiple Access (CDMA), Global System for Mobile Communications (GSM), Universal Mobile Communications System (UMTS), and/or Long-term Evolution (LTE) cellular wireless base station; a World-wide Interoperable Microwave Access (WiMAX) base station; a WiFi access point; a femtocell; or other wireless access devices. While FIG. 1 depicts only one base transceiver station 170, in an embodiment a plurality of base transceiver stations 170 may be existent and in operation.

The network 180 promotes communication between the components of the system 100. The network 180 may be any communication network including a public data network (PDN), a public switched telephone network (PSTN), a private network, and/or a combination.

The present disclosure also teaches the use of a call log that may supplement the notification screen 136. Missed phone calls and received voice mail messages are listed individually in the notification screen 136, even missed phone calls and received voice mail messages from the same sender. The call log may supplement the notification screen 136 by grouping missed phone calls and received voice mail messages by sender and by date. The call log may be accessed from the user interface of the portable electronic device 110.

The present disclosure also teaches a third form of notification in addition to the announcement and the notification screen 136 that may be a hybrid of the two notification methods and present recent messages in a "while you were out" type of format. When a user of the portable electronic device 110 navigates away from an application, a temporary screen, window, or pane may appear and display the last few recent messages received. This display may be configurable by the user to show only a certain type of messages or only messages received from specific senders.

Figure 3A:
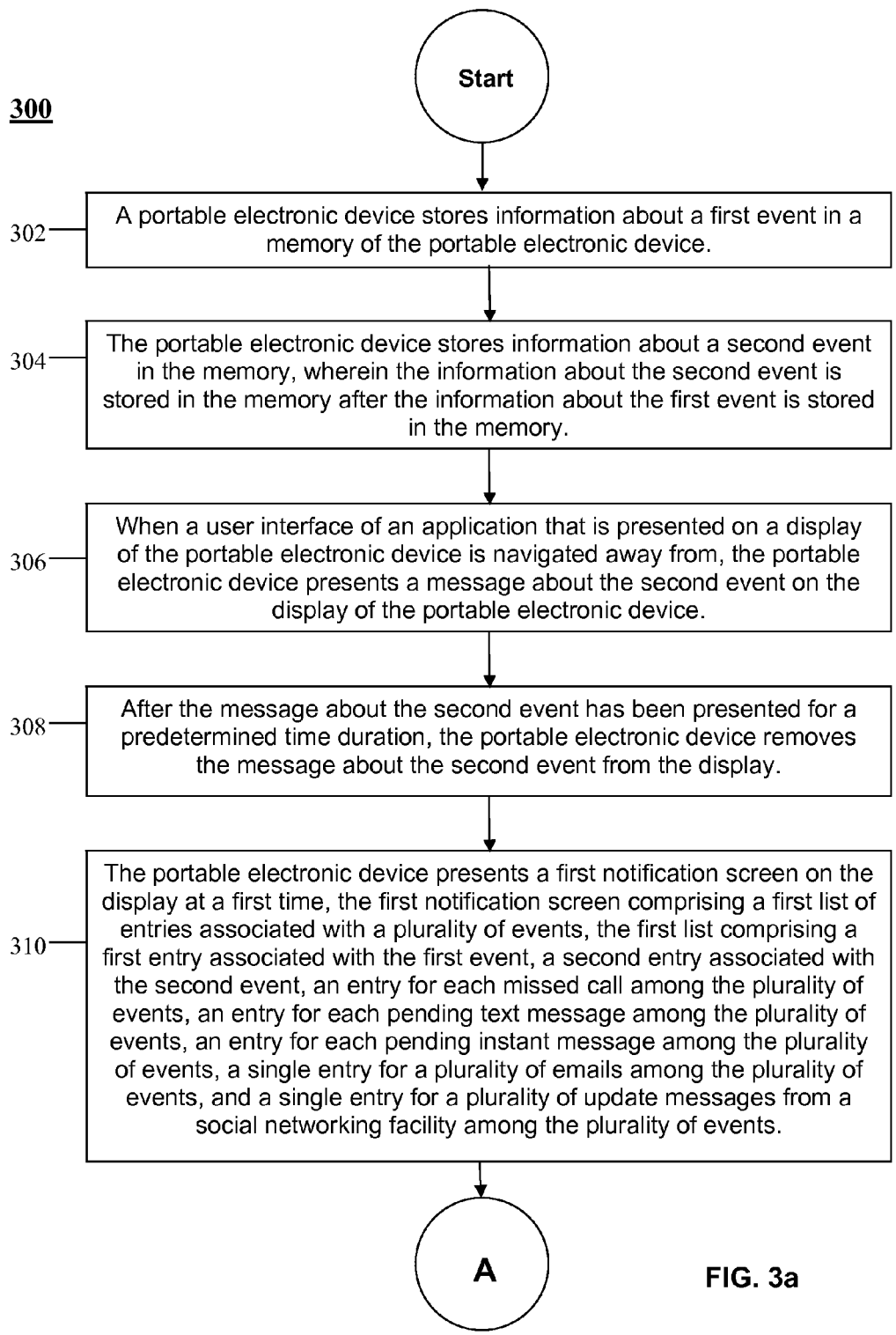
FIG. 3a is a flow chart illustrating a method according to an embodiment of the disclosure.
Figure 3B:
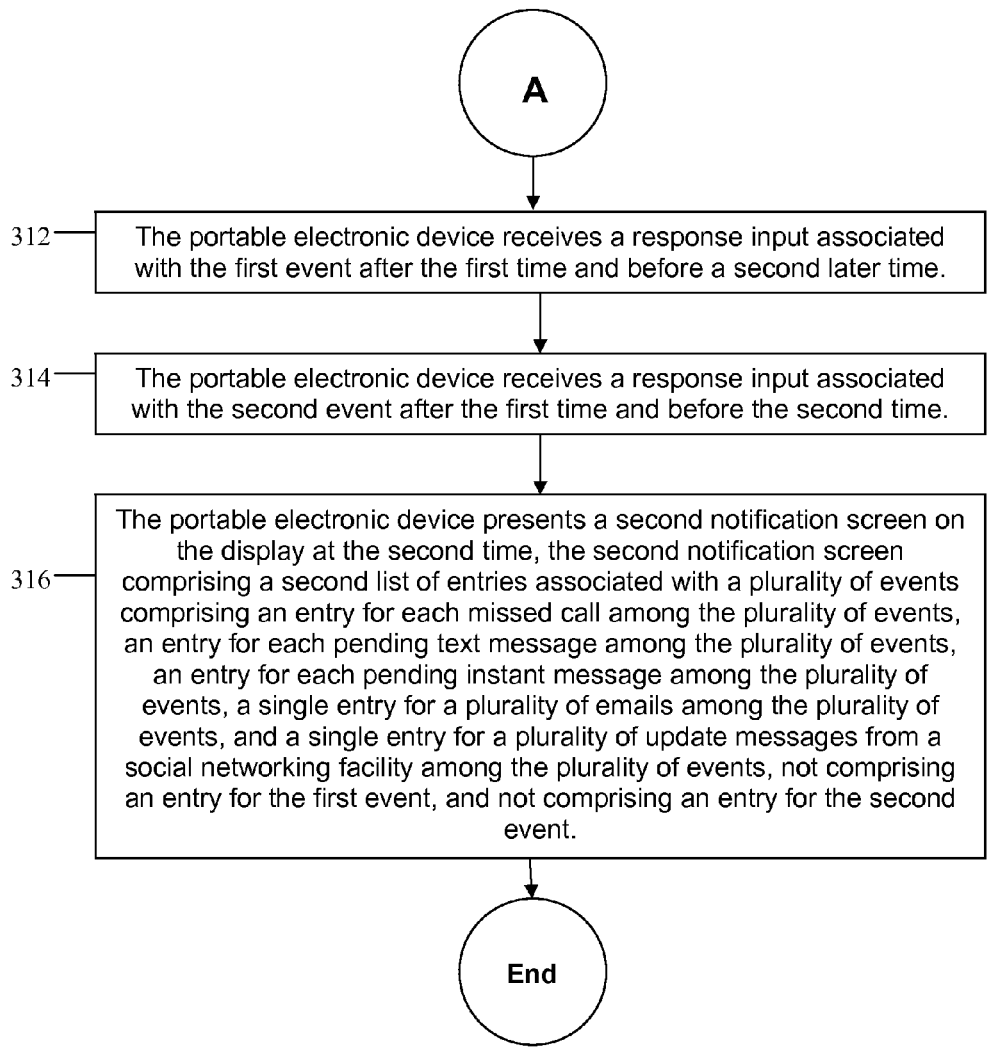
FIG. 3b is a flow chart illustrating a method according to an embodiment of the disclosure.

Turning now to FIG. 3a and FIG. 3b, a method 300 of presenting information about events on a portable electronic device 110 is provided. Beginning at block 302, information about a first event is stored in a memory of the portable electronic device 110.

At block 304, information about a second event is stored in the memory, wherein the information about the second event is stored in the memory after the information about the first event is stored in the memory. At block 306, when a user of an application that is presented on the display of the portable electronic device 110 navigates away from the application, a message is presented about the second event on the display. Block 306 describes the display of the announcement of the second event because the second event is the most recent event to occur on the portable electronic device 110 prior to the user navigating away from the application.

At block 308, the announcement of the second event is removed from the display after being presented for a predetermined time period, for example about ten seconds. At block 310, a first notification screen 136 is presented on the display of the portable electronic device 110 at a first time. The first notification screen 136 comprises a first list of entries associated with a plurality of events, the first list comprising a first entry associated with the first event, a second entry associated with the second event, an entry for each missed call among the plurality of events, an entry for each pending text message among the plurality of events, an entry for each pending instant message among the plurality of events, a single entry for a plurality of emails among the plurality of events, and a single entry for a plurality of update messages from a social networking facility among the plurality of events.

At block 312, the portable electronic device 110 receives a response input associated with the first event after the first time and before a second later time. The response input may comprise the user of the portable electronic device 110 selecting the entry in the first notification screen 136 for the first event by using a finger or pointing device to highlight and open the message in the notification screen 136 associated with the first event. This allows the user to view the first event and respond to, delete, store, or otherwise manage the first event.

At block 314, the portable electronic device 110 receives a response input associated with the second event after the first time and before the second time. As with the actions at block 312, the response input may comprise the user of the portable electronic device 110 selecting the entry in the first notification screen 136 for the second event by using a finger or pointing device to highlight and open the message in the notification screen 136 associated with the second event. This allows the user to view the second event as well as respond to, delete, store, or otherwise manage it.

Blocks 310, 312, and 314 comprise the user causing a new or first notification screen 136 to be opened in the display and selecting and opening the messages associated with the first and second events. Those two events had taken place after the previous time the user had opened the notification screen 136 so they appeared as new events in the first notification screen 136 as described at block 310.

At block 316, a second notification screen 136 is presented on the display at the second time. The second notification screen 136 comprises a second list of entries associated with a plurality of events comprising an entry for each missed call among the plurality of events, an entry for each pending text message among the plurality of events, an entry for each pending instant message among the plurality of events, a single entry for a plurality of emails among the plurality of events, and a single entry for a plurality of update messages from a social networking facility among the plurality of events.

Continuing at block 316, the second notification screen 136 does not comprise an entry for the first event nor does it comprise an entry for the second event. Those two events do not appear in the second notification screen 136 because the user of the portable electronic device 110 selected them earlier as described at blocks 312 and 314 during the presentation of the first notification screen 136. Because the first and second events were already selected and opened, the present disclosure teaches that they do not appear in the second or later notification screen 136.

Figure 4:
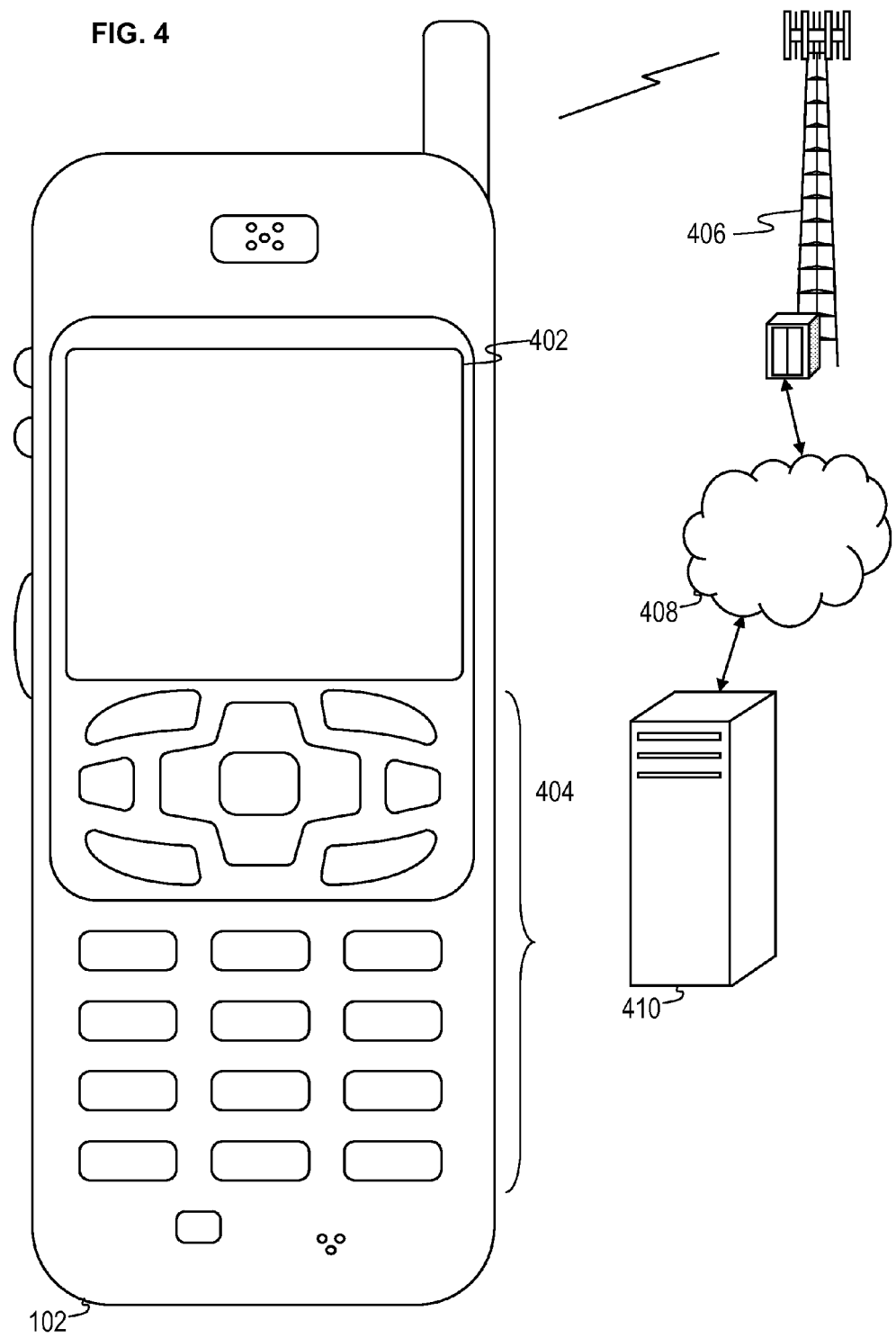
FIG. 4 is an illustration of a mobile device according to an embodiment of the disclosure.

FIG. 4 shows a wireless communications system including a mobile device 102. FIG. 4 depicts the mobile device 102, which is operable for implementing aspects of the present disclosure, but the present disclosure should not be limited to these implementations. The mobile device 102 may in some embodiments exemplify the portable electronic devices 110, 120 described in the system 100. Though illustrated as a mobile phone, the mobile device 102 may take various forms including a wireless handset, a pager, a personal digital assistant (PDA), a gaming device, an inventory control device, a media player, a digital camera, a digital calculator, a portable computer, a tablet computer, a laptop computer, and/or other. The device 102 may take various forms with a screen size reduced to a maximum of 4 inches by 6 inches, including a mobile telecommunication device, a mobile handset, a personal digital assistant (PDA), handheld gaming device, a handheld wireless mobile device, a pager, a digital camera, a digital music player, a digital calculator, and other portable electronic devices. The operator of the portable electronic device may select content formats based on the reduced screen size. Many suitable handsets combine some or all of these functions. In some embodiments of the present disclosure, the mobile device 102 is not a general purpose computing device like a portable, laptop or tablet computer, but rather is a special-purpose communications device such as a mobile phone, wireless handset, pager, or PDA. The mobile device 102 may support specialized activities such as gaming, inventory control, job control, and/or task management functions, and so on.

The mobile device 102 includes a display 402 and a touch-sensitive surface and/or keys 404 for input by a user. The mobile device 102 may present options for the user to select, controls for the user to actuate, and/or cursors or other indicators for the user to direct. The mobile device 102 may further accept data entry from the user, including numbers to dial or various parameter values for configuring the operation of the handset. The mobile device 102 may further execute one or more software or firmware applications in response to user commands. These applications may configure the mobile device 102 to perform various customized functions in response to user interaction. Additionally, the mobile device 102 may be programmed and/or configured over-the-air, for example from a wireless base station, a wireless access point, or a peer mobile device 102.

The mobile device 102 may execute a web browser application which enables the display 402 to show a web page. The web page may be obtained via wireless communications with a base transceiver station (BTS) 406, a wireless network access node, a peer mobile device 102 or any other wireless communication network or system. While a single base transceiver station 406 is illustrated, it is understood that the wireless communication system may comprise additional base transceiver stations. In some instances, the mobile device 102 may be in communication with multiple base transceiver stations 406 at the same time. The base transceiver station 406 (or wireless network access node) is coupled to a wired network 408, such as the Internet. Via the wireless link and the wired network, the mobile device 102 has access to information on various servers, such as a server 410. The server 410 may provide content that may be shown on the display 402. Alternately, the mobile device 102 may access the base transceiver station 406 through a peer mobile device 102 acting as an intermediary, in a relay type or hop type of connection.

FIG. 5 shows a block diagram of the mobile device 102. While a variety of known components of handsets 102 are depicted, in an embodiment a subset of the listed components and/or additional components not listed may be included in the mobile device 102. The mobile device 102 includes a digital signal processor (DSP) 502 and a memory 504. As shown, the mobile device 102 may further include an antenna and front end unit 506, a radio frequency (RF) transceiver 508, an analog baseband processing unit 510, a microphone 512, an earpiece speaker 514, a headset port 516, an input/output interface 518, a removable memory card 520, a universal serial bus (USB) port 522, an infrared port 524, a vibrator 526, a keypad 528, a touch screen liquid crystal display (LCD) with a touch sensitive surface 530, a touch screen/LCD controller 532, a charge-coupled device (CCD) camera 534, a camera controller 536, and a global positioning system (GPS) sensor 538. In an embodiment, the mobile device 102 may include another kind of display that does not provide a touch sensitive screen. In an embodiment, the DSP 502 may communicate directly with the memory 504 without passing through the input/output interface 518.

The DSP 502 or some other form of controller or central processing unit operates to control the various components of the mobile device 102 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The antenna and front end unit 506 may be provided to convert between wireless signals and electrical signals, enabling the mobile device 102 to send and receive information from a radio access network (RAN) or some other available wireless communications network or from a peer mobile device 102. In an embodiment, the antenna and front end unit 506 may include multiple antennas to support beam forming and/or multiple input multiple output (MIMO) operations. As is known to those skilled in the art, MIMO operations may provide spatial diversity which can be used to overcome difficult channel conditions and/or increase channel throughput. The antenna and front end unit 506 may include antenna tuning and/or impedance matching components, RF power amplifiers, and/or low noise amplifiers.

The RF transceiver 508 provides frequency shifting, converting received RF signals to baseband and converting baseband transmit signals to RF. In some descriptions a radio transceiver or RF transceiver may be understood to include other signal processing functionality such as modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions. For the purposes of clarity, the description here separates the description of this signal processing from the RF and/or radio stage and conceptually allocates that signal processing to the analog baseband processing unit 510 and/or the DSP 502 or other central processing unit. In some embodiments, the RF transceiver 508, portions of the antenna and front end 506, and the analog baseband processing unit 510 may be combined in one or more processing units and/or application specific integrated circuits (ASICs).

The analog baseband processing unit 510 may provide various analog processing of inputs and outputs, for example analog processing of inputs from the microphone 512 and the headset port 516 and outputs to the earpiece speaker 514 and the headset port 516. To that end, the analog baseband processing unit 510 may have ports for connecting to the built-in microphone 512 and the earpiece speaker 514 that enable the mobile device 102 to be used as a mobile phone. The analog baseband processing unit 510 may further include a port for connecting to a headset or other hands-free microphone and speaker configuration. The analog baseband processing unit 510 may provide digital-to-analog conversion in one signal direction and analog-to-digital conversion in the opposing signal direction. In some embodiments, at least some of the functionality of the analog baseband processing unit 510 may be provided by digital processing components, for example by the DSP 502 or by other central processing units.

The DSP 502 may perform modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions associated with wireless communications. In an embodiment, for example in a code division multiple access (CDMA) technology application, for a transmitter function the DSP 502 may perform modulation, coding, interleaving, and spreading, and for a receiver function the DSP 502 may perform despreading, deinterleaving, decoding, and demodulation. In another embodiment, for example in an orthogonal frequency division multiplex access (OFDMA) technology application, for the transmitter function the DSP 502 may perform modulation, coding, interleaving, inverse fast Fourier transforming, and cyclic prefix appending, and for a receiver function the DSP 502 may perform cyclic prefix removal, fast Fourier transforming, deinterleaving, decoding, and demodulation. In other wireless technology applications, yet other signal processing functions and combinations of signal processing functions may be performed by the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the mobile device 102 to function as a peripheral device to exchange information with a personal computer or other computer system. The infrared port 524 and other optional ports such as a Bluetooth interface or an IEEE 802.11 compliant wireless interface may enable the mobile device 102 to communicate wirelessly with other nearby handsets and/or wireless base stations.

The input/output interface 518 may further connect the DSP 502 to the vibrator 526 that, when triggered, causes the mobile device 102 to vibrate. The vibrator 526 may serve as a mechanism for silently alerting the user to any of various events such as an incoming call, a new text message, and an appointment reminder.

The keypad 528 couples to the DSP 502 via the interface 518 to provide one mechanism for the user to make selections, enter information, and otherwise provide input to the mobile device 102. Another input mechanism may be the touch screen LCD 530, which may also display text and/or graphics to the user. The touch screen LCD controller 532 couples the DSP 502 to the touch screen LCD 530.

The CCD camera 534 enables the mobile device 102 to take digital pictures. The DSP 502 communicates with the CCD camera 534 via the camera controller 536. The GPS sensor 538 is coupled to the DSP 502 to decode global positioning system signals, thereby enabling the mobile device 102 to determine its position. In another embodiment, a camera operating according to a technology other than charge coupled device cameras may be employed. Various other peripherals may also be included to provide additional functions, e.g., radio and television reception.

FIG. 6 illustrates a software environment 602 that may be implemented by the DSP 502. The DSP 502 executes operating system drivers 604 that provide a platform from which the rest of the software operates. The operating system drivers 604 provide drivers for the handset hardware with standardized interfaces that are accessible to application software. The operating system drivers 604 include application management services ("AMS") 606 that transfer control between applications running on the mobile device 102. Also shown in FIG. 6 are a web browser application 608, a media player application 610, and JAVA applets 612. The web browser application 608 configures the mobile device 102 to operate as a web browser, allowing a user to enter information into forms and select links to retrieve and view web pages. The media player application 610 configures the mobile device 102 to retrieve and play audio or audiovisual media. The JAVA applets 612 configure the mobile device 102 to provide games, utilities, and other functionality. The notification application 614 may be equivalent to the notification applications 130, 140 provided by the system 100.

Figure 7:
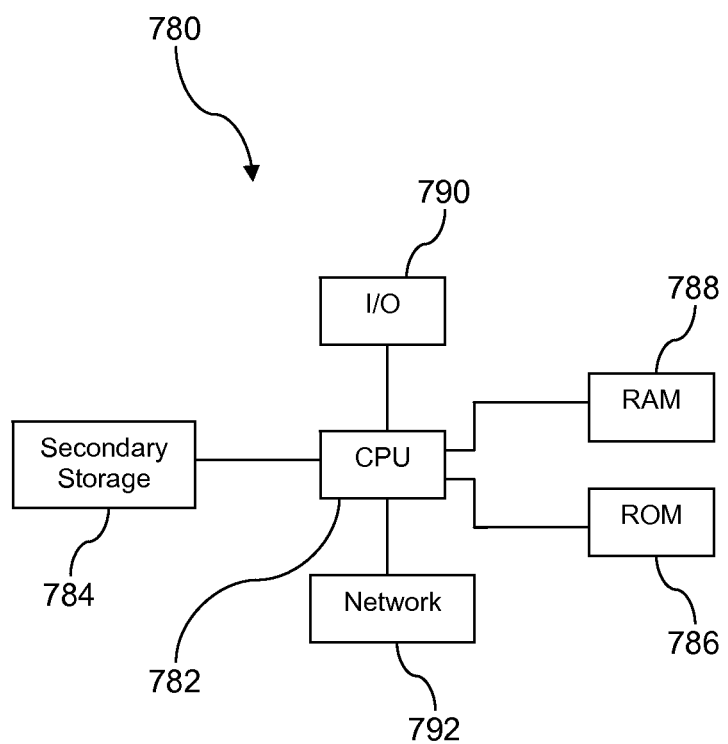
FIG. 7 illustrates an exemplary computer system suitable for implementing some aspects of the several embodiments of the disclosure.

FIG. 7 illustrates a computer system 780 suitable for implementing one or more embodiments disclosed herein. The computer system 780 includes a processor 782 (which may be referred to as a central processor unit or CPU) that is in communication with memory devices including secondary storage 784, read only memory (ROM) 786, random access memory (RAM) 788, input/output (I/O) devices 790, and network connectivity devices 792. The processor 782 may be implemented as one or more CPU chips.

It is understood that by programming and/or loading executable instructions onto the computer system 780, at least one of the CPU 782, the RAM 788, and the ROM 786 are changed, transforming the computer system 780 in part into a particular machine or apparatus having the novel functionality taught by the present disclosure. It is fundamental to the electrical engineering and software engineering arts that functionality that can be implemented by loading executable software into a computer can be converted to a hardware implementation by well known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 784 is typically comprised of one or more disk drives or tape drives and is used for non-volatile storage of data and as an over-flow data storage device if RAM 788 is not large enough to hold all working data. Secondary storage 784 may be used to store programs which are loaded into RAM 788 when such programs are selected for execution. The ROM 786 is used to store instructions and perhaps data which are read during program execution. ROM 786 is a non-volatile memory device which typically has a small memory capacity relative to the larger memory capacity of secondary storage 784. The RAM 788 is used to store volatile data and perhaps to store instructions. Access to both ROM 786 and RAM 788 is typically faster than to secondary storage 784. The secondary storage 784, the RAM 788, and the ROM 786 may be referred to in some contexts as non-transitory storage or non-transitory computer readable media.

I/O devices 790 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 792 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. These network connectivity devices 792 may enable the processor 782 to communicate with an Internet or one or more intranets. With such a network connection, it is contemplated that the processor 782 might receive information from the network, or might output information to the network in the course of performing the above-described method steps. Such information, which is often represented as a sequence of instructions to be executed using processor 782, may be received from and outputted to the network, for example, in the form of a computer data signal embodied in a carrier wave.

Such information, which may include data or instructions to be executed using processor 782 for example, may be received from and outputted to the network, for example, in the form of a computer data baseband signal or signal embodied in a carrier wave. The baseband signal or signal embodied in the carrier wave generated by the network connectivity devices 792 may propagate in or on the surface of electrical conductors, in coaxial cables, in waveguides, in an optical conduit, for example an optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, may be generated according to several methods well known to one skilled in the art. The baseband signal and/or signal embedded in the carrier wave may be referred to in some contexts as a transitory signal.

The processor 782 executes instructions, codes, computer programs, scripts which it accesses from hard disk, floppy disk, optical disk (these various disk based systems may all be considered secondary storage 784), ROM 786, RAM 788, or the network connectivity devices 792. While only one processor 782 is shown, multiple processors may be present. Thus, while instructions may be discussed as executed by a processor, the instructions may be executed simultaneously, serially, or otherwise executed by one or multiple processors. Instructions, codes, computer programs, scripts, and/or data which may be accessed from the secondary storage 784, for example, hard drive, floppy disk, optical disk, and other, from the ROM 786 and the RAM 388 may be referred to in some contexts as non-transitory instructions or non-transitory information.

In an embodiment, the computer system 780 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 780 to provide the functionality of a number of servers that is not directly bound to the number of computers in the computer system 780. For example, virtualization software may provide 20 virtual servers on 4 physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein implementing the functionality disclosed above. The computer program product may comprise data, data structures, files, executable instructions, and other information. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 780, at least portions of the contents of the computer program product to the secondary storage 784, to the ROM 786, to the RAM 788, and/or to other non-volatile memory and volatile memory of the computer system 780. The processor 782 may process the executable instructions and/or data in part by directly accessing the computer program product, for example by reading from a CD-ROM disk inserted into a disk drive peripheral of the computer system 780. The computer program product may comprise instructions that promote the loading and/or copying of data, data structures, files, and/or executable instructions to the secondary storage 784, to the ROM 786, to the RAM 788, and/or to other non-volatile memory and volatile memory of the computer system 780.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A portable electronic device, comprising:
a processor;
a non-transitory memory;
a display; and
a notification application stored in the non-transitory memory that, upon execution by at least the processor, configures at least the processor to:
receive an indication of a plurality of events,
store event information associated with the plurality of events in the memory, and
present an announcement about at least a most recent stored event information in a notification screen of the display in response to navigating away from a user interface of an application that was being used when at least one of the plurality of events occurred.

2. The portable electronic device of claim 1, wherein the announcement about the most recently stored event information is presented transiently in the notification screen of the display.

3. The portable electronic device of claim 1, wherein the portable electronic device is one of a mobile phone, a personal digital assistant (PDA), or a media player.

4. The portable electronic device of claim 1, further comprising a radio transceiver, wherein at least some of the events are communication events engaging the radio transceiver, wherein the radio transceiver provides the indications of the communication events to the first application, and wherein the radio transceiver transmits and receives based on at least one of a code division multiple access (CDMA) technology, a global system for mobile communication (GSM) technology, a long-term evolution (LTE) technology, or a worldwide interoperability for microwave access (WiMAX) technology.

5. The portable electronic device of claim 1, wherein the plurality of events comprise at least one of a calendar application event, an application status report event, a portable electronic device hardware status report event, a missed voice call event, a received text message event, a received instant message event, a received email event, or a received social networking status report event.

6. The portable electronic device of claim 1, wherein the display is a reduced size display.

7. The portable electronic device of claim 1, wherein the presentation of the announcement is removed from the display a predefined time duration after being displayed, and wherein the predefined time duration is less than ten seconds.

8. A portable electronic device, comprising:
a processor;
a non-transitory memory;
a display; and
a notification application stored in the non-transitory memory that, upon execution by at least the processor, configures at least the processor to:
receive indications of a plurality of events, and
in response to an application being navigated away from, present a list of the plurality of events in a notification screen of the display based on at least one of the indications, wherein the application was being used when at least one of the plurality of events was received, and wherein the list comprises: an entry for each missed call among the plurality of events, an entry for each pending text message among the plurality of events, an entry for each pending instant message among the plurality of events, a single entry for a plurality of emails among the plurality of events, and a single entry for a plurality of update messages from a social networking facility among the plurality of events.

9. The portable electronic device of claim 8, wherein the portable electronic device is one of a mobile phone, a personal digital assistant (PDA), or a media player.

10. The portable electronic device of claim 8, wherein the list comprises an entry for each of a plurality of missed calls from a first party, wherein the list comprises an entry for each of a plurality of text messages from a second party, and wherein the list comprises an entry for each of a plurality of instant messages from a third party.

11. The portable electronic device of claim 8,
wherein each event of the plurality of events is associated with a time of occurrence of the event, and
wherein the entries for missed calls, the entries for pending text messages, and the entries for pending instant messages are presented in the list in chronological order of time of occurrence, with entries associated with the most recent time presented at an upper end of the list and entries associated with earlier time lower in the list.

12. The portable electronic device of claim 11, wherein the single entry for the plurality of emails and the single entry for the plurality of update messages from the social networking facility are presented in a fixed position in a lower edge of a notification screen on the display, and wherein the entries for missed calls, pending text messages, and instant messages are presented in a scrollable list above the single entry for the plurality of emails and the single entry for the plurality of update messages in the notification screen.

13. The portable electronic device of claim 8, wherein the list further comprises an entry for each pending voicemail.

14. A processor-implemented method of presenting information about events on a portable electronic device, comprising:
    storing information about a first event in a non-transitory memory of the portable electronic device;
    storing information about a second event in the non-transitory memory, wherein the information about the second event is stored in the non-transitory memory after the information about the first event is stored in the non-transitory memory;
    presenting, by a notification application configuring a processor of the portable electronic device, a message about the second event on the display in response to navigating away from a user interface of an application presented on a display of the portable electronic device, wherein the application was being used when the second event occurred;
    after the message about the second event has been presented for a predetermined time duration, removing the message about the second event from the display;
    presenting a first notification screen on the display at a first time, the first notification screen comprising a first list of entries associated with a plurality of events, the first list comprising a first entry associated with the first event, a second entry associated with the second event, an entry for each missed call among the plurality of events, an entry for each pending text message among the plurality of events, an entry for each pending instant message among the plurality of events, a single entry for a plurality of emails among the plurality of events, and a single entry for a plurality of update messages from a social networking facility among the plurality of events;
    receiving a response input associated with the first event after the first time and before a second later time;
    receiving a response input associated with the second event after the first time and before the second time; and
    presenting a second notification screen on the display at the second time, the second notification screen comprising a second list of entries associated with a plurality of events comprising an entry for each missed call among the plurality of events, an entry for each pending text message among the plurality of events, an entry for each pending instant message among the plurality of events, a single entry for a plurality of emails among the plurality of events, and a single entry for a plurality of update messages from a social networking facility among the plurality of events, not comprising an entry for the first event, and not comprising an entry for the second event.

15. The method of claim 14, wherein the portable electronic device is one of a mobile phone, a personal digital assistant (PDA), or a media player.

16. The method of claim 14, wherein the plurality of events comprises at least one of a calendar application event, an application status report event, a portable electronic device hardware status event, a missed voice call event, a received text message event, a received instant message event, a received email event, or a received social networking status report event.

17. The method of claim 14, wherein the predetermined time duration is less than ten seconds.

18. The method of claim 14, wherein the entries for missed calls, the entries for pending text messages, and the entries for pending instant messages are presented in chronological order in the first list and in the second list.

19. The method of claim 14, wherein the single entry for the emails and the single entry for the update messages from the social networking facility are presented at the bottom of the first notification screen and at the bottom of the second notification screen.

20. The method of claim 14, wherein the single entry for the emails indicates a number of unread emails.

\* \* \* \* \*